US007854992B2

(12) United States Patent
Fu et al.

(10) Patent No.: US 7,854,992 B2
(45) Date of Patent: Dec. 21, 2010

(54) CONDUCTIVE TAPE AND METHOD FOR MAKING THE SAME

(75) Inventors: Wei-Qi Fu, Beijing (CN); Peng Liu, Beijing (CN); Yuan-Chao Yang, Beijing (CN); Chen Feng, Beijing (CN); Xiao-Bo Zhang, Beijing (CN); Liang Liu, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/967,115

(22) Filed: Dec. 29, 2007

(65) Prior Publication Data

US 2008/0245548 A1 Oct. 9, 2008

(30) Foreign Application Priority Data

Apr. 6, 2007 (CN) ........................ 2007 1 0073979

(51) Int. Cl.
*B32B 9/00* (2006.01)

(52) U.S. Cl. ..................... 428/408; 423/447.1; 165/185

(58) Field of Classification Search ................ 428/408; 977/742; 423/447.1
See application file for complete search history.

(56) References Cited

U.S. PATENT DOCUMENTS

| | | | | |
|---|---|---|---|---|
| 4,226,752 | A * | 10/1980 | Erickson et al. | 524/460 |
| 6,863,942 | B2 * | 3/2005 | Ren et al. | 428/36.9 |
| 6,924,335 | B2 * | 8/2005 | Fan et al. | 524/495 |

FOREIGN PATENT DOCUMENTS

| | | |
|---|---|---|
| JP | 2005097003 | * 4/2005 |
| WO | WO 01/92150 | * 12/2001 |

* cited by examiner

*Primary Examiner*—David R Sample
*Assistant Examiner*—Daniel Miller
(74) *Attorney, Agent, or Firm*—Jeffrey T. Knapp

(57) ABSTRACT

The present invention relates to a conductive tape. The conductive tape includes a base, an adhesive layer, and a carbon nanotube layer. The adhesive layer is configured for being sandwiched between the base and the carbon nanotube layer. And a method for making the conductive tape includes the steps of: fabricating at least one carbon nanotube film and an adhesive agent; coating the adhesive agent on a base and drying the adhesive agent on the base so as to form an adhesive layer; and forming a carbon nanotube layer on the adhesive layer and compressing the carbon nanotube layer so as to sandwich the adhesive layer between the carbon nanotube layer and the base.

17 Claims, 3 Drawing Sheets

10

CONDUCTIVE TAPE AND METHOD FOR MAKING THE SAME

RELATED APPLICATIONS

This application is related to common-assigned applications entitled, "CONDUCTIVE TAPE AND METHOD FOR MAKING THE SAME", filed Dec. 29, 2007 Ser. No. 11/967,122; "CONDUCTIVE TAPE AND METHOD FOR MAKING THE SAME", filed Dec. 29, 2007 Ser. No. 11/967,123. Disclosures of the above-identified applications are incorporated herein by reference.

BACKGROUND

1. Field of the Invention

The invention generally relates to conductive tapes and methods for making the same, and, particularly, to a conductive tape including array of carbon nanotubes and a method for the same.

2. Discussion of Related Art

During scanning electron microscopy (SEM) and X-ray spectroscopy (EDS) analysis, a conductive adhesive material is usually needed to fix samples for observation. Currently, Carbon Conductive Tape (CCT) is widely used as the adhesive and conductive material. The CCT includes amorphous carbon.

However, the CCT has the following drawbacks. Firstly, electrical resistance of the CCT is relatively large, generally about 700 K ohm/centimeter (KΩ/cm). Secondly, production cost of the CCT is relatively high.

What is needed, therefore, is a conductive tape, which has a low electrical resistance and good conductivity, and a method for making the same, which has low production cost.

SUMMARY

A conductive tape includes a base, an adhesive layer, and a carbon nanotube layer. The adhesive layer is configured for being sandwiched between the base and the carbon nanotube layer. And a method for making the conductive tape includes the steps of: fabricating at least one carbon nanotube film and an adhesive agent; coating the adhesive agent on a base and drying the adhesive agent on the base so as to form an adhesive layer; and forming a carbon nanotube layer on the adhesive layer and compressing the carbon nanotube layer so as to sandwich the adhesive layer between the carbon nanotube layer and the base.

Other advantages and novel features of the present conductive tape and method for making the same film will become more apparent from the following detailed description of present embodiments when taken in conjunction with the accompanying drawings.

BRIEF DESCRIPTION OF THE DRAWINGS

Many aspects of the present conductive tape and method for making the same can be better understood with reference to the following drawings. The components in the drawings are not necessarily to scale, the emphasis instead being placed upon clearly illustrating the principles of the present conductive tape and method for making the same.

Figure 1:
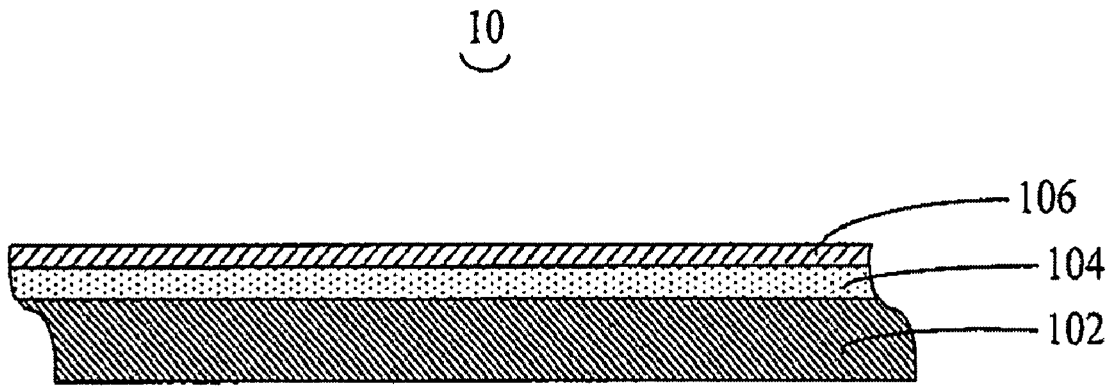
FIG. 1 shows a sectional and schematic view of a conductive tape in accordance with the present embodiment.

Corresponding reference characters indicate corresponding parts throughout the several views. The exemplifications set out herein illustrate at least one present embodiment of the conductive tape and method for making the same, in at least one form, and such exemplifications are not to be construed as limiting the scope of the invention in any manner.

DETAILED DESCRIPTION OF PREFERRED EMBODIMENTS

Reference will now be made to the drawings, in detail, to describe embodiments of the method for making the carbon nanotube film.

Referring to FIG. 1, a conductive tape 10 is provided in the present embodiment. The conductive tape 10 includes a base 102, an adhesive layer 104 and a carbon nanotube layer 106. The adhesive layer 104 is configured for being sandwiched between the base 102 and the carbon nanotube layer 106. The adhesive layer 104 includes a pressure sensitive adhesive layer. The base 102 is selected from the group consisting of polymer films having good tensile strength.

The carbon nanotube layer 106 is a pulled carbon nanotube film. The pulled carbon nanotube film includes a plurality of carbon nanotube segments connected end to end. Lengths of the carbon nanotube segments are generally equal. Each of the carbon nanotube segments includes a plurality of carbon nanotube bundles parallel to each other and combined by van der Waals attractive force end to end. Adjacent carbon nanotube bundles are combined by van der Waals attractive force with each other. Further, lengths of the carbon nanotube bundles are generally equal and each of the carbon nanotube bundles includes a plurality of carbon nanotubes arranged in parallel. The carbon nanotubes are selected from the group consisting of single-walled carbon nanotubes, and multi-walled carbon nanotubes. The carbon nanotube film is pulled out from an array of carbon nanotubes. The array of carbon nanotubes is formed by one of a chemical vapor deposition method, an arc discharge method, and a laser evaporation method. Quite suitably, the array of carbon nanotubes is a super-aligned array of carbon nanotubes.

It is to be noted that the carbon nanotubes in the pulled carbon nanotube film are all substantially parallel to the pulling direction of the carbon nanotube film. In the present embodiment, the carbon nanotubes can, opportunely, be arranged along a longitudinal direction of the conductive tape 10. That is, the pulling direction is parallel to the longitudinal direction of the conductive tape 10. The carbon nanotubes in the pulled carbon nanotube film are parallel to a longitudinal direction of the conductive tape. Through experimental measurement, an electrical resistance of the carbon nanotube film along the pulling direction is about 3.2 K ohm/cm, and an electrical resistance of the carbon nanotube film along a direction perpendicular to the pulling direction is about 12.8 K ohm/cm. Understandably, the carbon nanotubes can also be arranged along other directions according to practical needs, and the electrical resistance can advantageously be regulated by specific experimental parameters.

Figure 2:
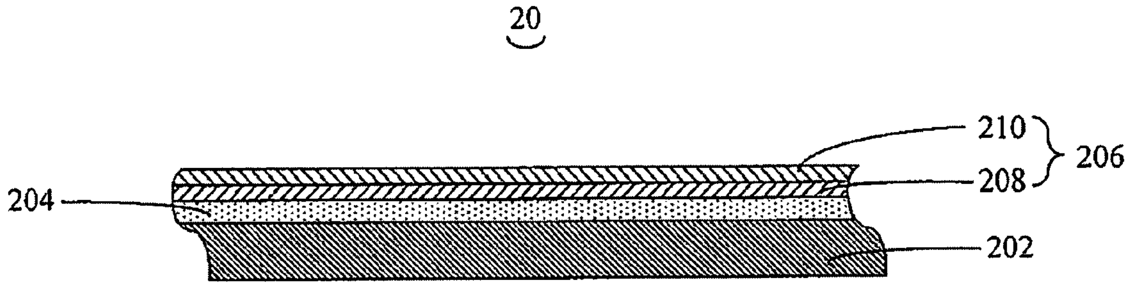
FIG. 2 shows a sectional and schematic view of a conductive tape in accordance with another embodiment.

Referring to FIG. 2, a conductive tape 20 is provided in another embodiment. The conductive tape 20 includes a base 202, an adhesive layer 204, and a carbon nanotube layer 206. The adhesive layer 204 is configured for sandwiching between the base 202 and the carbon nanotube layer 206. The carbon nanotube layer 206 contains a first carbon nanotube film 208 and a second carbon nanotube film 210. The first carbon nanotube film 208 is disposed near the adhesive layer 204, and the second carbon nanotube film 210 is disposed opposite to the adhesive layer 204. A difference of the conductive tape 20 with the conductive tape 10 is that the carbon nanotube layer 206 includes overlapped carbon nanotube films. It is to be noted that the overlapped carbon nanotube films are configured to form an integrated carbon nanotube layer 206 with an angle of $\alpha$, $0 \leqq \alpha \leqq 90°$. The specific degree of $\alpha$ depends on practical needs. That is, the nanotubes of one carbon nanotube film are oriented along a same direction and the nanotubes in an adjacent carbon nanotube film are all oriented in a direction 0-90 degrees different from the first film, and $\alpha$ is the angle of difference between the two orientations.

In the present embodiment, the carbon nanotube layer 206 includes two carbon nanotube films, and $\alpha$ is 90 degrees. Through experimental measurement, an electrical resistance along the pulling direction of the first carbon nanotube film 208 is about 1.7 K ohm/cm, and an electrical resistance along the pulling direction of the second carbon nanotube film 210 is about 1.3 K ohm/cm. Compared with the carbon nanotube film in the conductive tape 10, the carbon nanotube layer 206 in the conductive tape 20 has a low electrical resistance and a uniform conductivity distributed in different directions. Understandably, the carbon nanotubes in the carbon nanotube layer 206 can also be arranged along other directions according to practical needs, and the electrical resistance can be advantageously regulated by specific experimental parameters.

It is noted that the carbon nanotube film has good conductivity along the pulling direction. Thus, the carbon nanotube layer includes a plurality of overlapped carbon nanotube films. The overlapped carbon nanotube films are configured to form an integrated carbon nanotube layer 206 with an angle of $\alpha$, $0 \leqq \alpha \leqq 90°$. The specific degrees of $\alpha$ are advantageously used to reduce the differences of conductivity in different directions. Moreover, the number of overlapped carbon nanotube films can, opportunely be used to regulate the conductivity of the carbon nanotube layer to be within a certain range.

In practical use, good conductivity through the sides of the conductive tape is also beneficially needed. The conductive tape in the present embodiment can, opportunely, be folded so as to form a double-side conductive tape. The folded conductive tape will have good conductivity through the sides, that is from one side of the tape through to the other side of the tape.

Figure 3:
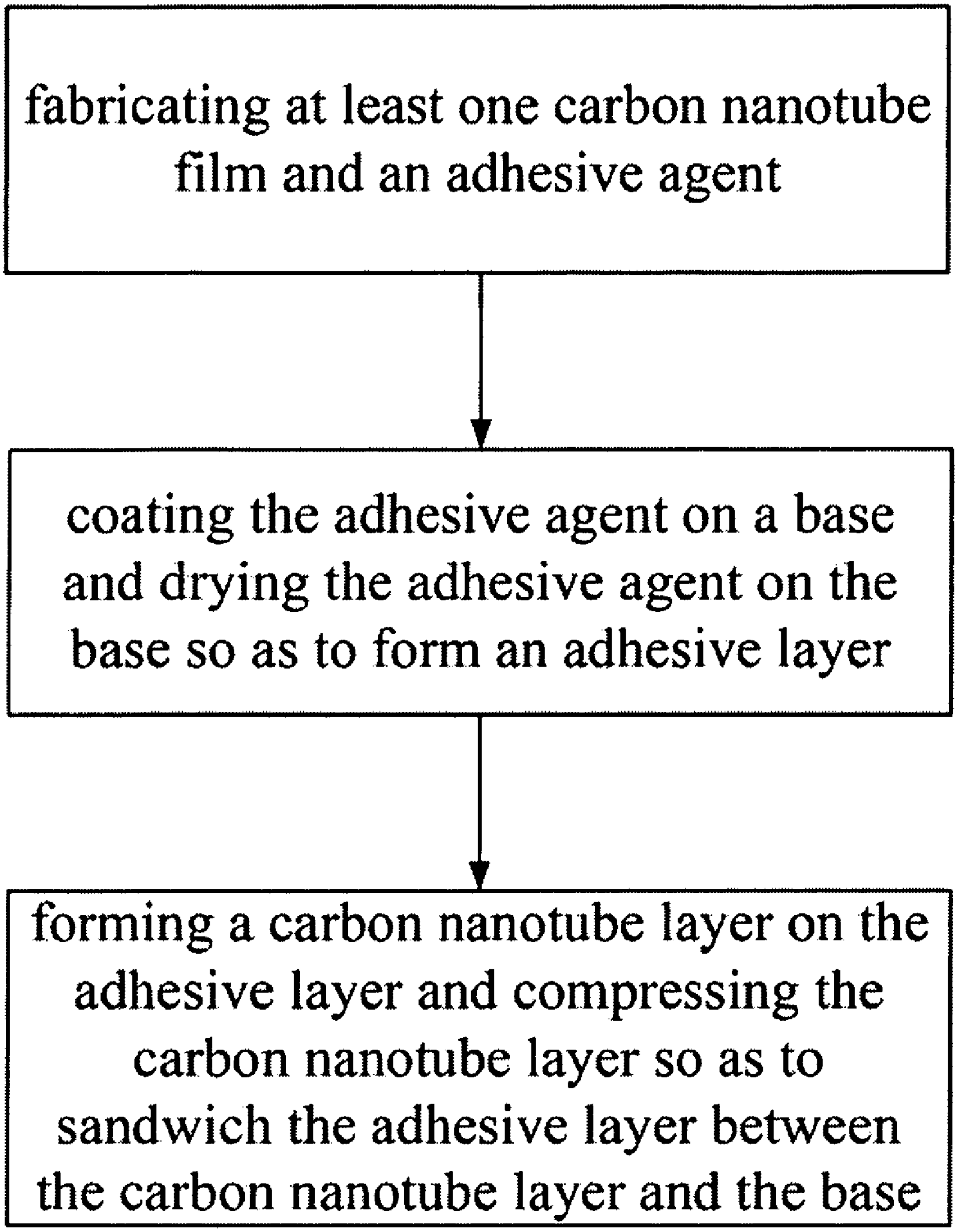
FIG. 3 is a flow chart of a method for making the conductive tape shown in FIG. 1 and FIG. 2.

Referring to FIG. 3, a method for making a conductive tape 10 is provided in the present embodiment. The method includes the steps of: (a) fabricating at least one carbon nanotube film and an adhesive agent; (b) coating the adhesive agent on a base and drying the adhesive agent on the base so as to form an adhesive layer; and (c) forming a carbon nanotube layer on the adhesive layer and compressing the carbon nanotube layer so as to sandwich the adhesive layer between the carbon nanotube layer and the base.

In step (a), the carbon nanotube film is formed by the substeps of: (a1) forming an array of carbon nanotubes; and (a2) pulling the carbon nanotube film out from the array of carbon nanotubes.

In step (a1), the array of carbon nanotubes is a super-aligned array of carbon nanotubes in the present embodiment. The super-aligned array of carbon nanotubes can be formed by the steps of: (a11) providing a substantially flat and smooth substrate; (a12) forming a catalyst layer on the substrate; (a13) annealing the substrate with the catalyst layer in air at a temperature in the approximate range from 700° C. to 900° C. for about 30 to 90 minutes; (a14) heating the substrate with the catalyst layer at a temperature in the approximate range from 500° C. to 740° C. in a furnace with a protective gas therein; and (a15) supplying a carbon source gas to the furnace for about 5 to 30 minutes and growing a super-aligned array of carbon nanotubes on the substrate.

In step (a11), the substrate can be a P-type silicon wafer, an N-type silicon wafer, or a silicon wafer with a film of silicon dioxide thereon. Preferably, a 4-inch P-type silicon wafer is used as the substrate. In step (a12), the catalyst can, advantageously, be made of iron (Fe), cobalt (Co), nickel (Ni), or any alloy thereof.

In step (a14), the protective gas can, beneficially, be made up of at least one of nitrogen (N2), ammonia (NH3), and a noble gas. In step (a15), the carbon source gas can be a hydrocarbon gas, such as ethylene (C2H4), methane (CH4), acetylene (C2H2), ethane (C2H6), or any combination thereof.

The super-aligned array of carbon nanotubes can, opportunely, have a height of about 200 to 400 microns and includes a plurality of carbon nanotubes parallel to each other and approximately perpendicular to the substrate. The super-aligned array of carbon nanotubes formed under the above conditions is essentially free of impurities, such as carbonaceous or residual catalyst particles. The carbon nanotubes in the super-aligned array are closely packed together by the van der Waals attractive force. The carbon nanotubes can be single-walled carbon nanotubes or multi-walled carbon nanotubes. A diameter of the multi-walled carbon nanotubes is in the approximate range from 5 nanometers to 50 nanometers. A diameter of the single-walled carbon nanotubes is in the approximate range from 0.5 nanometers to 10 nanometers.

In step (a2), quite usefully, carbon nanotube segments having a predetermined width can be selected by using an adhesive tape as the tool to contact with the super-aligned array. The pulling direction is, usefully, substantially perpendicular to the growing direction of the super-aligned array of carbon nanotubes. More specifically, during the pulling process, as the initial carbon nanotube segments are drawn out, other carbon nanotube segments are also drawn out end to end, due to the van der Waals attractive force between ends of adjacent segments. The carbon nanotube film produced in such manner can be selectively formed having a predetermined width. The carbon nanotube film includes a plurality of carbon nanotube segments. The carbon nanotubes in the carbon nanotube film are all substantially parallel to the pulling direction of the carbon nanotube film.

The width of the carbon nanotube film depends on a size of the carbon nanotube array. The length of the carbon nanotube film can arbitrarily be set as desired. In one useful embodiment, when the substrate is a 4-inch type wafer as in the present embodiment, a width of the carbon nanotube film is in a range from 1 centimeter to 10 centimeters, a thickness of the carbon nanotube film is in an approximate range from 0.01 nanometers to 10 microns, and a thickness of the carbon nanotube layer is in an approximate range from 0.01 microns to 100 microns When at least two carbon nanotube films are needed, the carbon nanotube films can be formed by repeating the steps (a1) and (a2). Another method can also be used to form the at least two carbon nanotube films. Specifically, a large carbon nanotube film can opportunely be formed as in the steps (a2). And then, the large carbon nanotube film is cut into a plurality of small carbon nanotube films.

In step (a), a method for making the adhesive agent is provided in the present embodiment. Specifically, butyl acrylate, 2-ethylhexyl acrylate, vinyl acetate, glycidyl methacrylate, acrylic acid, benzoyl peroxide, toluene and ethyl acetate are mixed and uniformly dispersed, thereby forming the adhesive agent. Quite suitably, mass ratios of the above-described substances are 112.5:116.5:12.5:1.25:7.5:0.5:87.5:162.5 in that order. A process of dispersing is selected from the group consisting of a cell breaking method and an ultrasonic vibrating method. Further, due to high cohesion and bonding strength of the adhesive agent, it can be used to fabricate adhesive tapes, self-adhesive labels, double-sided adhesive tapes, and other adhesive products. When the adhesive agent is used for double-sided adhesive tapes, its adhesive strength is up to 5.6 N/cm. Understandably, the mass percentages of the above-described substances can, advantageously, be selected according to practical needs.

In step (b), the drying step includes air-drying, heat-drying, or a combination thereof.

Step (c) includes the substeps of: (c1) putting the base with the adhesive layer coated thereon onto a platform, and configuring the adhesive layer opposite to the platform; (c2) forming a carbon nanotube layer on the adhesive layer; and (c3) compressing the carbon nanotube layer.

In step (c1), the base coated the adhesive layer is tightly put onto a planar surface of the platform. In step (c2), a process of forming the carbon nanotube layer is put the at least one carbon nanotube film onto the adhesive layer. Quite suitably, when the carbon nanotube layer contains a carbon nanotube film, which is directly put on the adhesive layer, and whose carbon nanotubes are arranged along the length direction of the base. Understandably, when the carbon nanotube films contains at least two carbon nanotube films, the at least two carbon nanotube films overlaps the adhesive layer in order. Due to the carbon nanotube film having a plurality of carbon nanotubes arranged along the pulling direction, when the carbon nanotube layer contains at least two overlapped carbon nanotube films, adjacent carbon nanotube films are disposed with an angle of $\alpha$, $0 \leqq \alpha \leqq 90°$. In step (c3), a plastic roller is used to compress the carbon nanotube layer.

The conductive tape in the present embodiment has a carbon nanotube layer. The carbon nanotube layer can make the present conductive tape have conductivity in an arbitrary direction. The carbon nanotube layer includes a carbon nanotube film or at least two overlapped carbon nanotube films. Each carbon nanotube film has a plurality of carbon nanotubes arranged along a same direction. Thus, the conductive tape has good electrical conductivity and low electrical resistance. Moreover, the method in the present embodiments employs relatively few carbon nanotubes to obtain the same electrical conductivity of CCT. Thus, the method for making the conductive tape has a low production cost.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention

What is claimed is:

1. A method for making a conductive tape, the method comprising the steps of:

(a) fabricating at least two carbon nanotube films and providing adhesive agent, each of the at least two carbon nanotube films including a plurality of carbon nanotube segments connected end to end, each of the carbon nanotube segments comprised of a plurality of carbon nanotube bundles parallel to each other and combined by van der Waals attractive force end to end, each of the carbon nanotube bundles comprised of a plurality of carbon nanotubes arranged in parallel;

(b) coating the adhesive agent on a base and drying the adhesive agent on the base so as to form an adhesive layer; and (c) putting the at least two carbon nanotube films onto the adhesive layer to form a carbon nanotube layer on the adhesive layer and compressing the carbon nanotube layer so as to sandwich the adhesive layer between the carbon nanotube layer and the base, wherein in step (a), the process of fabricating the at least two carbon nanotube films includes the substeps of: (a1) forming an array of carbon nanotubes; (a2) pulling the at least two carbon nanotube films out from the array of carbon nanotubes, the at least two carbon nanotube films overlapped with each other are put on the adhesive layer;

wherein step (c) comprises the substeps of:

(c1) putting the base with the adhesive layer coated thereon onto a platform, and configuring the adhesive layer opposite to the platform;

(c2) putting the carbon nanotube layer on the adhesive layer; and (c3) compressing the carbon nanotube layer.

2. The method as claimed in claim 1, wherein in step (a), the process of providing the adhesive agent comprises the steps of mixing and dispersing butyl acrylate, 2-ethylhexyl acrylate, vinyl acetate, glycidyl methacrylate, acrylic acid, benzoyl peroxide, toluene and ethyl acetate.

3. The method as claimed in claim 1, wherein in step (b), the drying step is comprised of air-drying, heat-drying, or a combination thereof.

4. The method as claimed in claim 1, wherein in step (c3), a roller is used to compress the carbon nanotube layer.

5. The method as claimed in claim 1, wherein the substantially all of the carbon nanotubes of the at least two carbon nanotube films are substantially parallel to the pulling direction.

6. The method as claimed in claim 1, wherein the carbon nanotubes of the array of carbon nanotubes are parallel to each other and approximately perpendicular to the substrate.

7. The method as claimed in claim 1, wherein the carbon nanotubes of the at least two carbon nanotube films are parallel to a longitudinal direction of the conductive tape.

8. A method for making a conductive tape, the method comprising the steps of:

(a) fabricating at least one carbon nanotube film and providing adhesive agent, the at least one carbon nanotube film including a plurality of carbon nanotube segments connected end to end, each of the carbon nanotube segments comprised of a plurality of carbon nanotube bundles parallel to each other and combined by van der Waals attractive force end to end, each of the carbon nanotube bundles comprised of a plurality of carbon nanotubes arranged in parallel;

(b) forming an adhesive layer on a base; and (c) putting the at least one carbon nanotube film onto the adhesive layer to form a carbon nanotube layer on the adhesive layer and compressing the carbon nanotube layer so as to sandwich the adhesive layer between the carbon nanotube layer and the base, wherein in step (a), the process of fabricating the carbon nanotube film includes the substeps of: (a1) forming an array of carbon nanotubes; (a2) pulling the at least one carbon nanotube film out from the array of carbon nanotube; wherein, the carbon nanotubes of the carbon nanotube film are aligned along the length of the base and a surface of the at least one carbon nanotube film is parallel to the length direction of the base.

9. The method as claimed in claim 8, wherein in step (a), the process of providing the adhesive agent comprises the steps of mixing and dispersing butyl acrylate, 2-ethylhexyl acrylate, vinyl acetate, glycidyl methacrylate, acrylic acid, benzoyl peroxide, toluene and ethyl acetate.

10. The method as claimed in claim 8, wherein in step (b), the drying step is selected from the group consisting of air-drying, heat-drying, or a combination thereof.

11. The method as claimed in claim 8, wherein step (c) comprises the substeps of:

(c1) placing the base with the adhesive layer coated thereon onto a platform;

(c2) putting the carbon nanotube layer on the adhesive layer; and (c3) applying pressure to the carbon nanotube layer.

12. The method as claimed in claim 8, wherein in step (c3), a roller is used to apply pressure to the carbon nanotube layer.

13. The method as claimed in claim 8, wherein substantially all of the carbon nanotubes of the at least one carbon nanotube film are all substantially parallel to the pulling direction.

14. The method as claimed in claim 8, wherein in the step (a1), the array of carbon nanotubes grows on a substrate; and the carbon nanotubes of the array of carbon nanotubes are parallel to each other and approximately perpendicular to the substrate.

15. The method as claimed in claim 8, wherein the direction of pulling the array of carbon nanotube is substantially perpendicular to the growing direction of the array of carbon nanotubes.

16. The method as claimed in claim 8, wherein during the pulling the array of carbon nanotube, as initial carbon nanotube segments are drawn out, other carbon nanotube segments are also drawn out end to end, due to the van der Waals attractive force between ends of adjacent segments.

17. The method as claimed in claim 8, wherein the at least one carbon nanotube films pulled from the array of carbon nanotube has a predetermined width.

* * * * *